US012683981B1

(12) United States Patent
Galinkin et al.

(10) Patent No.: US 12,683,981 B1
(45) Date of Patent: Jul. 14, 2026

(54) PROFILING BRUTE FORCE CYBERATTACKS

(71) Applicant: Rapid7, Inc., Boston, MA (US)

(72) Inventors: Erick Jason Galinkin, Monroe, NC (US); Curtis Paul Barnard, Silver Spring, MD (US)

(73) Assignee: Rapid7, Inc., Boston, MA (US)

( * ) Notice: Subject to any disclaimer, the term of this patent is extended or adjusted under 35 U.S.C. 154(b) by 408 days.

(21) Appl. No.: 17/851,483

(22) Filed: Jun. 28, 2022

(51) Int. Cl.
H04L 9/40        (2022.01)

(52) U.S. Cl.
CPC ........ H04L 63/1416 (2013.01); H04L 63/145 (2013.01)

(58) Field of Classification Search
CPC ........................... H04L 63/1416; H04L 63/145
See application file for complete search history.

(56) References Cited

U.S. PATENT DOCUMENTS

| | | | | |
|---|---|---|---|---|
| 7,426,709 | B1 * | 9/2008 | Ganesan | G06F 30/34 |
| | | | | 710/110 |
| 8,250,652 | B1 * | 8/2012 | Powell | G06F 21/554 |
| | | | | 726/22 |
| 9,094,288 | B1 * | 7/2015 | Nucci | H04L 43/026 |
| 10,284,371 | B2 * | 5/2019 | Sterne | H04L 63/08 |
| 10,372,905 | B1 * | 8/2019 | McClintock | G06F 21/566 |
| 10,523,699 | B1 * | 12/2019 | Alamuri | H04L 63/08 |
| 10,805,346 | B2 * | 10/2020 | Kumar | H04L 63/0227 |
| 10,979,454 | B1 * | 4/2021 | Hodgman | H04L 63/0281 |

| | | | | |
|---|---|---|---|---|
| 10,992,706 | B2 * | 4/2021 | Burch | H04L 63/083 |
| 11,363,059 | B2 * | 6/2022 | Sodja | H04L 63/0263 |
| 11,803,638 | B2 * | 10/2023 | Favor | G06F 9/3838 |
| 12,388,843 | B1 * | 8/2025 | Shahrivar | H04L 41/16 |
| 12,463,987 | B1 * | 11/2025 | Shahrivar | H04L 63/1416 |
| 2008/0256230 | A1 * | 10/2008 | Handley | H04L 63/145 |
| | | | | 709/224 |
| 2012/0084866 | A1 * | 4/2012 | Stolfo | H04L 63/1416 |
| | | | | 726/25 |
| 2019/0190952 | A1 * | 6/2019 | Cherry | H04L 63/1491 |
| 2019/0334724 | A1 * | 10/2019 | Anton | G06F 16/9535 |
| 2020/0112585 | A1 * | 4/2020 | Keohane | G06F 21/316 |
| 2020/0135045 | A1 * | 4/2020 | Alyuz Civitci | G06V 40/171 |
| 2020/0213334 | A1 * | 7/2020 | Kutner | H04L 63/1416 |
| 2020/0280573 | A1 * | 9/2020 | Johnson | G06F 21/554 |
| 2020/0285726 | A1 * | 9/2020 | Kalous | G07C 9/00817 |
| 2020/0322378 | A1 * | 10/2020 | Yang | H04L 63/1408 |
| 2020/0351299 | A1 * | 11/2020 | Burch | H04L 63/1416 |
| 2020/0396239 | A1 * | 12/2020 | Kaidi | H04L 63/1416 |

(Continued)

FOREIGN PATENT DOCUMENTS

WO        2021018440 A1        2/2021

*Primary Examiner* — Gary S Gracia
(74) *Attorney, Agent, or Firm* — Ashwin Anand

(57)        ABSTRACT

Various embodiments include systems and methods to implement profiling of cyberattacks, where the profiling is performed by a security platform. Profiling of cyberattacks may be performed by determining sets of access attempts that are associated with one or more cyberattacks, where the sets of access attempts are used to profile subsequent access attempts. The security platform may determine whether a given set of access attempts is similar to previous sets of access attempts determined to be cyberattacks using various techniques, including set similarity, set overlap coefficients, or equality of hash data associated with different sets of access attempts.

15 Claims, 6 Drawing Sheets

(56) References Cited

U.S. PATENT DOCUMENTS

| | | | | |
|---|---|---|---|---|
| 2021/0021631 A1* | 1/2021 | Okutan | ................. | H04L 63/164 |
| 2021/0075794 A1* | 3/2021 | Gazit | .................. | H04L 63/1408 |
| 2021/0152581 A1* | 5/2021 | Hen | ...................... | G06F 21/604 |
| 2021/0168159 A1* | 6/2021 | Jain | .................... | H04L 63/1416 |
| 2021/0297441 A1* | 9/2021 | Olalere | .............. | H04L 63/1408 |
| 2022/0109687 A1* | 4/2022 | Sloane | ................... | H04L 43/04 |
| 2022/0407893 A1* | 12/2022 | Maiman | ............... | H04W 12/71 |

* cited by examiner

300
Time = $t_1$
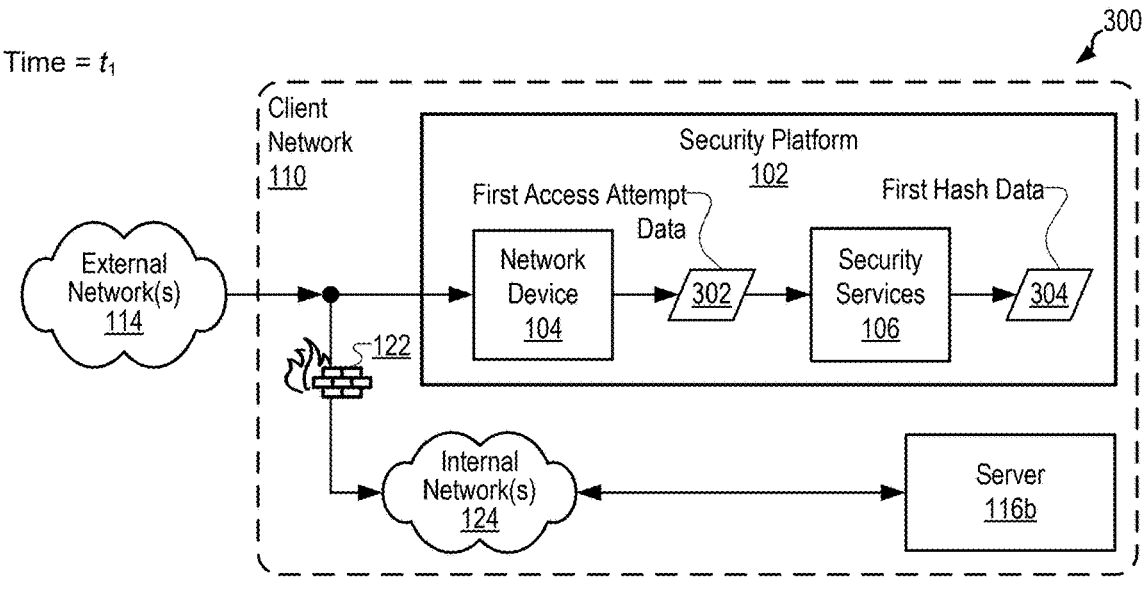
Time = $t_2$
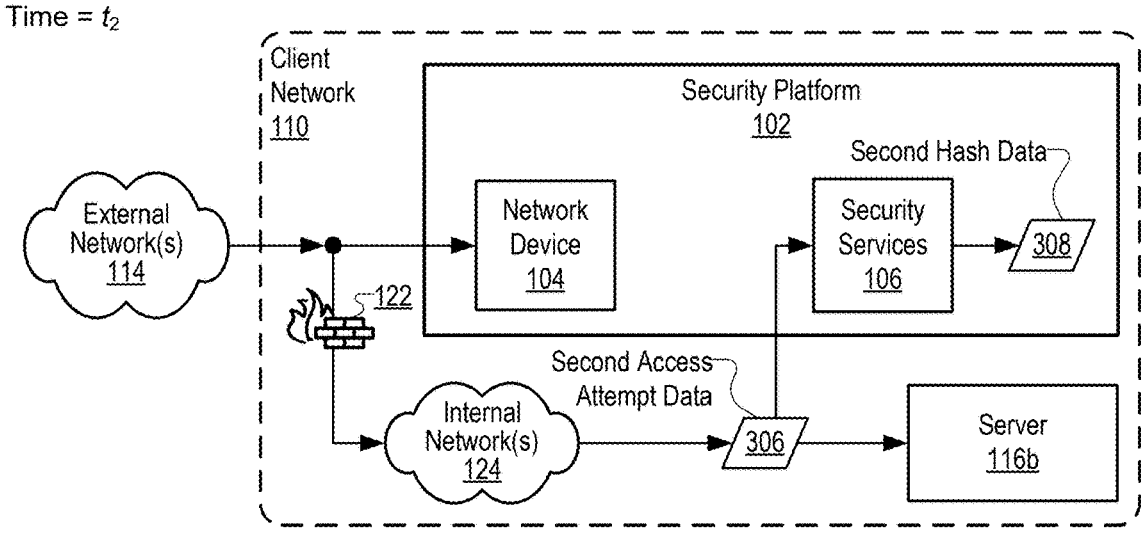
Time = $t_3$
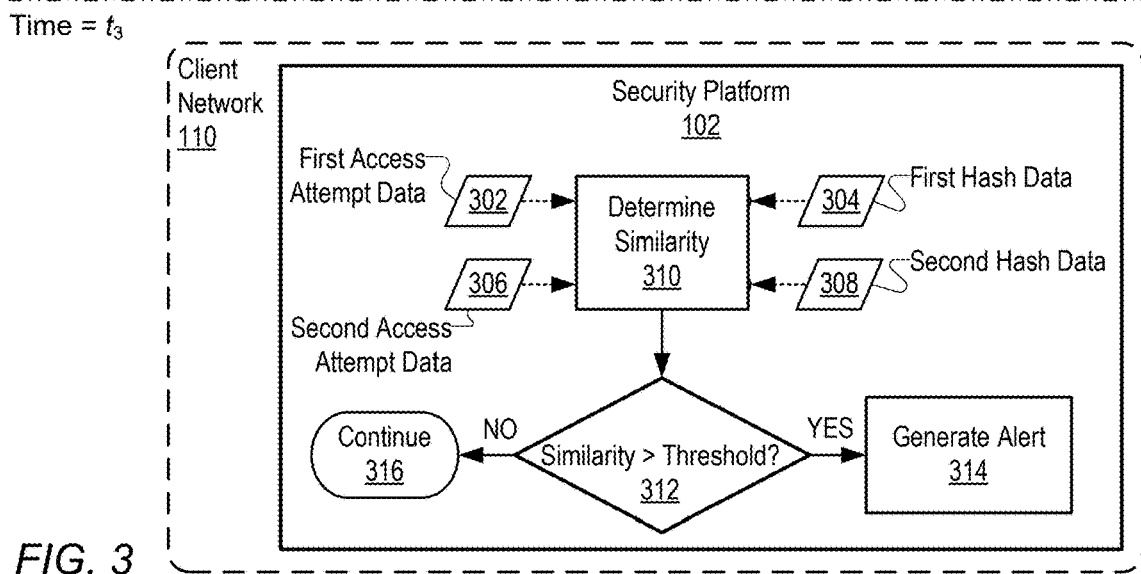
FIG. 3

400

Determine, with respect to a first network device, a first set of access attempts, where the first network device is associated with detecting unauthorized access to a computing resource.
410

Determine, with respect to a second network device, a second set of access attempts associated with the computing resource.
420

Determine a measure of similarity between the first set of access attempts and the second set of access attempts.
430

Determine, based on the measure of similarity being greater than a similarity threshold, that the second set of access attempts is indicative of a cyberattack.
440

*FIG. 4*

PROFILING BRUTE FORCE CYBERATTACKS

BACKGROUND

Many companies operate computer environments that are connected to public networks such as the internet. While such connections allow users to access resources on public networks, they also expose a company network to cyberattacks. Cyberattacks may obtain sensitive information, gain control of the company's computing systems, or damage company resources. To prevent cyberattacks, security management systems have become increasingly important to protect private company networks against these types of vulnerabilities.

BRIEF DESCRIPTION OF THE DRAWINGS

FIG. 3 is a block diagram illustrating a security platform providing cyberattack profiling, in accordance with some embodiments.

FIG. 4 is a flowchart that illustrates an example of a security platform providing cyberattack profiling, according to some embodiments.

Figure 1:
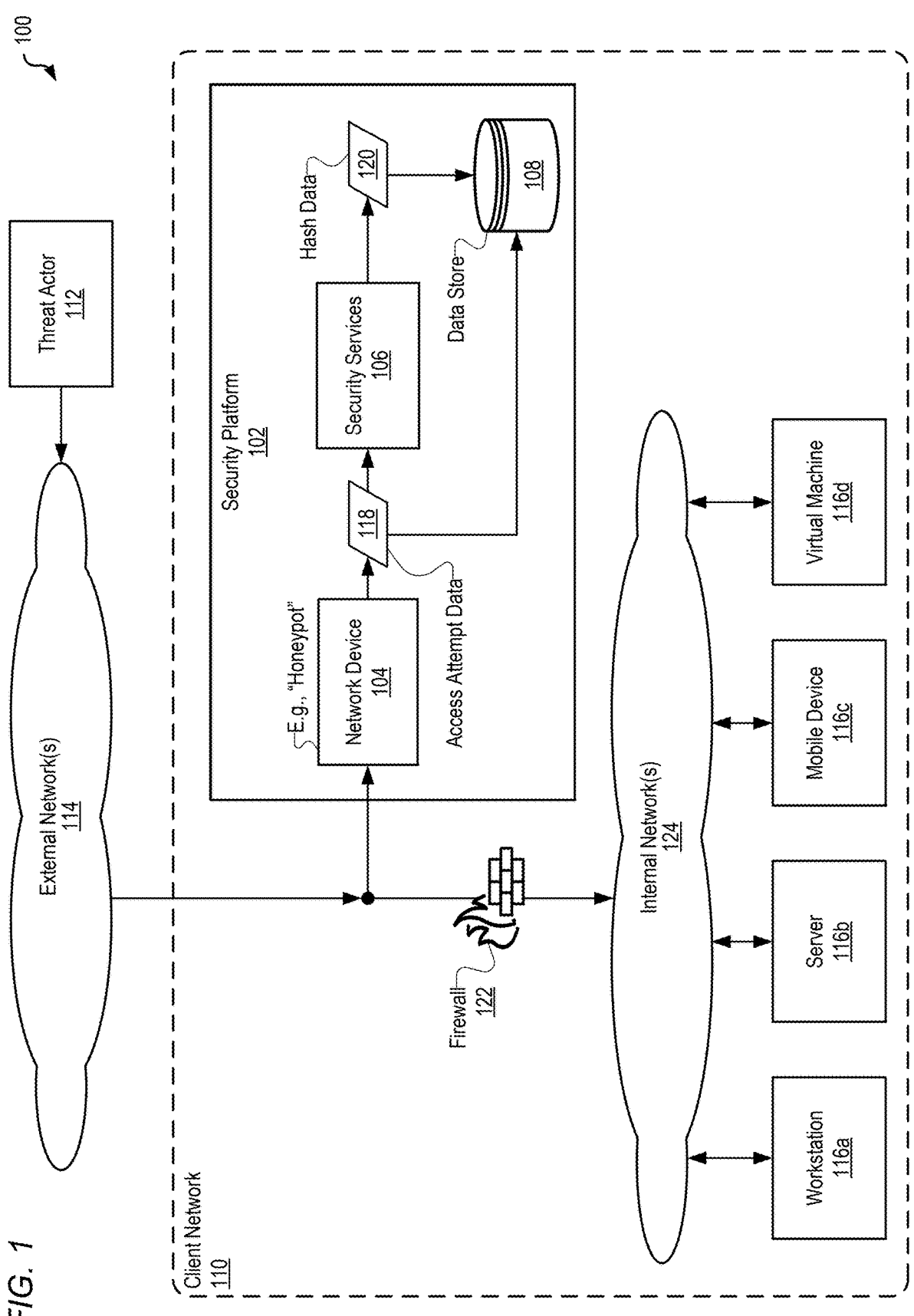
FIG. 1 is a block diagram illustrating a security platform providing cyberattack profiling, in accordance with some embodiments.

While embodiments are described herein by way of example for several embodiments and illustrative drawings, those skilled in the art will recognize that embodiments are not limited to the embodiments or drawings described. It should be understood that the drawings and detailed description are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to".

DETAILED DESCRIPTION OF EMBODIMENTS

As disclosed, a security platform may improve protection from cyberattacks based on previously profiled cyberattacks, such as a brute force cyberattack from a threat actor. The security platform may determine that ongoing access attempts are cyberattacks based on a comparison to data collected from previous access attempts that have been identified as cyberattacks. The previous access attempts may be identified as cyberattacks based on the access attempts being associated with network devices configured to be targets of a cyberattack. Based on profile information of a cyberattack, remediation efforts may be specifically tailored in accordance with the profile information.

To identify a cyberattack, the security platform may collect data from a network device or devices configured to monitor and track unauthorized access attempts directed to one or more computing resources within a network. In some examples, such a network device may be referred to as a "honeypot" or a "security device". The one or more computing resources may be servers, virtual machines, workstations, mobile devices, or any other type of computing resource or any type of asset deployed within a client network.

Traditional systems may generally be able to identify a brute force attack, which may allow for some type of remediation efforts. However, traditional systems may be unable to profile a cyberattack using previously determined attack data. Such a lack of profiling of a cyberattack leaves fewer, or possibly later, remediation options than if more information about an attacker were known sooner.

In some implementations, the security platform may use access attempt data collected from a security device to build a database of cyberattack attempts. The security platform may use the database of cyberattack attempt data as a reference during subsequent access attempts to determine whether the subsequent access attempt may be a cyberattack. The access attempt data may be indicative of features of a cyberattack, such as a type of tool used to perform a cyberattack, an organization associated with the cyberattack, and so forth. In some examples, the security platform may use a first tool to determine a current cyberattack, and given a detected cyberattack, use information from previous cyberattacks to profile the current cyberattack.

In some implementations, the security platform may determine whether an ongoing cyberattack matches a profile of a prior cyberattack in constant time order of approximation. For example, the security platform may determine, from among a plurality of access attempts, one or more sets of access attempts. In this example, a given set of access attempts may be delineated from another set of access attempts using different techniques. As one example technique, the security platform may use a time-based clustering of access attempts to determine a given set of access attempts.

In this example implementation, the security platform may apply a hash function on a given set of access attempts to determine first hash data. Stored hash data, including the first hash data, from the one or more sets of access attempts may be used in profiling later access attempts. The hash data may be stored in a database or other data store. In this example, subsequent to determining the hash data, the security platform may determine one or more ongoing access attempts that may or may not be authorized.

Continuing this example implementation, the security platform may apply the hash function on the one or more ongoing access attempts to determine second hash data. The security platform may compare the second hash data to each hash data value in the database. The security platform may determine whether the second hash data matches hash data in the database using at most N comparisons, where N may be a number of hash data values in the database.

In some implementations, if there is no match of hash data, the security platform may determine that an ongoing one or more access attempts are indicative of a cyberattack using different techniques. For example, the security platform may determine whether the ongoing one or more access attempts are similar to a given set of access attempts associated with prior cyberattacks. If the security platform determines that the ongoing one or more access attempts are similar to a given set associated with prior cyberattacks, the security platform may generate an alert that is indicative of a cyber threat.

Continuing this example implementations, the security platform may determine similarity between ongoing access attempts and prior access attempts associated with a cyberattack based on determining a Jaccard similarity between sets of access attempts. Jaccard similarity may be a value associated with a ratio of a union of a first and second sets and an intersection of first and second sets, where a first set may be a set of ongoing access attempts and a second set may be a set of prior access attempts associated with a cyberattack.

In some implementations, if there is no match of hash data, the security platform may instead of, or in addition to using a Jaccard similarity, use a set overlap coefficient. For example, a set overlap coefficient may be a Szymkiewicz-Simpson coefficient. A set overlap coefficient may be indicative of a size of an intersection of two sets divided by a smaller of the size of the two sets. In this example, as in the above example, a first set may be a set of ongoing access attempts and a second set may be a set of prior access attempts associated with a cyberattack.

An advantage of the disclosed security platform is that a profile associated with a threat actor may be used to prioritize remediation efforts on computing resources that may be most vulnerable. Such prioritization may make efficient use of limited remediation resources in cases where not all computing resources may be addressed at a same time. Another advantage is that other access attempts on other networks may be determined to be cyberattacks based on comparisons to sets of access attempts determined to be associated with cyberattacks.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as Referring to FIG. 1, an example computing environment 100 illustrates various components of a security platform profiling cyberattacks, in accordance with some embodiments.

In some implementations, the security platform 102 may provide one or more security services. In this example, the security services may include detection and profiling of cyberattacks. The security platform 102 may collect access attempt data and determine cyberattack profiles that may be used to subsequently identify threat actors. A threat actor may include a tool, a software program, a compute instance, or some other entity associated with a cyberattack.

In this example, the security platform 102 may comprise at least a network device 104, a security services 106 module, and a data store 108. In this example, the security platform 102 may be implemented within a client network, such as client network 110. In some examples, the security platform 102 may be implemented externally from the client network 110.

In some implementations, portions of the security platform 102 may be implemented internally to the client network 110 and other portions of the security platform 102 may be implemented externally from the client network 110. As one such example, the network device 104 may be implemented within the client network 110, and the remaining components of the security platform 102 may be implemented externally from the client network 110.

The network device 104 may be configured to monitor and track unauthorized access attempts associated with one or more computing resources within a client network. In some examples, the network device 104 may be referred to as a "honeypot".

The network device 104 may provide a network endpoint that allows login access attempts. In this example, any access attempts detected by the network device 104 may be determined to be security threats or associated with a cyberattack. In some examples, the security platform 102 may comprise multiple network devices configured to monitor and track unauthorized access attempts or accesses, including different types of such network devices (e.g., SSH (secure shell), RDP (remote desktop), and so forth).

In some implementations, a threat actor may be an application that automatically performs a sequence of access attempts. An access attempt may be associated with a given username and a given password used in attempt to gain access to a computing resource. The security platform 102 may determine that the sequence of access attempts is clustered together, where a cluster may be based on each access attempt being within a time threshold from each other access attempt in the cluster. For example, if a first access attempt is more than the time threshold from a second access attempt, then the security platform 102 may determine that the first access attempt and the second access attempt are in different clusters of access attempts.

In this example, a given set of access attempts may comprise a given cluster of access attempts. For example, a set of access attempts may comprise $\{\{U_1, P_1\}, \{U_2, P_2\}, \ldots, \{U_N, P_N\}\}$, where N is a number of username-password tuples within the set of access attempts. In some examples, a set of access attempts may be a data structure that stores each member of a set of access attempts.

Access attempt data may be indicative of characteristics associated with a set of access attempts. For example, access attempt data may be indicative of each member of a set of access attempts. In some examples, access attempt data may be indicative of additional characteristics, such as one or more of: an Internet Protocol (IP) address associated with a given one or more access attempts, a geographic region associated with an access attempt, a geopolitical entity associated with an access attempt, an internet service provider, a pattern of access attempts, an order of access attempts, a frequency of access attempts, a time of an access attempt, among other descriptive characteristics of a given set of access attempts.

As described below, data associated with access attempt data may be hashed to generate hash data. For each set of access attempts, corresponding hash data may be stored by the security platform 102, for example, within the data store 108. The security platform 102 may also store access attempt data 118 for each set of access attempts. The access attempt data 118 may be used by the security platform 102 in the cases where hash data is not a match between an ongoing access attempt and an access attempt associated with a cyberattack. The security platform 102 may use the access attempt data 118 to determine whether a set of access attempts associated with an ongoing access attempt is similar beyond a specified threshold to a set of access attempts associated with a cyberattack.

As depicted in FIG. 1, a threat actor may attempt to access one or more computing resources within a client network 110. In this example, a threat actor is depicted as threat actor 112, where the threat actor 112 attempts to access a computing resource within the client network 110 over external network 114. A computing resource may be any data, software, or hardware that may be accessed or used.

In this example, network device 104 may be configured to provide an isolated environment in which a threat actor may operate. The network device 104 may mimic an environment within the client network 110 and may be indistinguishable to a threat actor 112 from the client network 110. The environment provided by the network device 104 may include data, applications, and other computing resources. Activity, such as accessed files, applications, computer systems, or any computing resources may be monitored and recorded. Such activity may be used by the security platform 102 to determine a cyberattack profile associated with a threat actor. In this example, any and all accesses associated with network device 104 may be determined to be malicious and indicative of a cyberattack.

Access attempt data may comprise a cyberattack profile, where the cyberattack profile may be associated with a set of access attempts. Based on the cyberattack profile, the security platform 102 may determine an alert of a cyberattack that is indicative of one or more characteristics of the cyberattack profile. For example, the security platform 102 may determine an alert to indicate one or more data files that may be accessed, one or more applications that may be accessed, and/or one or more computing resources that may be accessed. The security platform 102 may determine an alert to indicate behavior associated with data, an application, or computing resource.

Continuing this example, the network device 104 may determine access attempt data 118 in response to a cyberattack. The security platform 102 may apply a hash function on the access attempt data 118 to determine hash data 120. A hash function may be any function that may be used to map data of arbitrary size to a fixed-size value. The security platform 102 may store hash data 120 within a hash table, or other data structure, within data store 108. Data store 108 may be a database.

As described above, access attempt data may be indicative of a set of access attempts, where a set of access attempts may be delineated from other sets of access attempts based on a time threshold. For example, if the time between a first N access attempts is less than a time threshold, and an $(N+1)^{st}$ access attempt is greater than the time threshold from the Nth access attempt, then the security platform 102 may determine that a set of access attempts comprises the first N access attempts, and that the $(N+1)^{st}$ access attempt is part of a subsequent set of access attempts. The time threshold may be an arbitrary period of time, such as 10 milliseconds, 100 milliseconds, 1 second, or some other period of time.

In this example, computing resources 116 within the client network 110 may be accessed through a firewall 122 from the external network 114. A firewall 122 may be a network security system that monitors and controls incoming and outgoing network traffic to an internal network 124 of the client network 110. The firewall 122 may monitor and control network traffic based on security rules to establish a barrier between computing resources 116 within the client network 110 and an untrusted network, such as the internet.

The client network 110 may include a plurality of computing resources, such as computing resources 116a-116d. In this example, computing resources 116a-116d are depicted as a workstation, a server, a mobile device, and a virtual machine. In other examples, a computing resource 116 may comprise personal computers, cloud compute instances, laptops, among other types of computing resources, or some other resource that may be vulnerable to a cyberattack. Computing resources 116 are described in greater detail with respect to FIG. 2.

Access attempts to computing resources within the client network 110 may be performed by authorized entities or by threat actors. In this example, a set of access attempts may be made and the security platform 102 may determine whether or not the set of access attempts are indicative of a cyberattack. Similar to determining a set of access attempts as described above with respect to determining a set of access attempts indicated by access attempt data 118, the security platform 102 may determine a set of access attempts associated with computing resources 116 of the client network 110.

In this example, the set of access attempts monitored and tracked by the network device 104 may be a first set of access attempts, where the first set of access attempts is associated with first hash data. The set of access attempts associated with the computing resources 116 may be a second set of access attempts, where the security platform 102 may determine whether or not the second set of access attempts is indicative of a cyberattack.

Given the second set of access attempts, the security platform 102 may determine second hash data based on applying the hash function to the second set of access attempts. If the first hash data is equal to the second hash data, the security platform 102 may determine that the second set of access attempts is indicative of a cyberattack. Based on the second set of attempts being indicative of a cyberattack, the security platform 102 may generate an alert indicative of a cyberattack, where the alert may further indicate any cyberattack profile information associated with a threat actor. Comparing hash data may be performed using at most N comparisons, where N may be a number of hash data values in the data store 108.

In this example, if the first hash data is not equal to the second hash data, then the security platform 102 may determine whether the second set of access attempts is similar enough to the first set of access attempts to determine that the second set of access attempts is indicative of a cyberattack. Similarity may be based on a Jaccard similarity being greater than a first threshold and/or a set overlap coefficient being greater than a second threshold.

In some implementations, to determine whether one set of access attempts is similar to another set of access attempts, the security platform 102 may determine a Jaccard similarity coefficient. For example, a first set may be A, where A={{U₁, P₁}, {U₂, P₂}, {U₃, P₃}}, and a second set may be B, where B={{U₁, P₁}, {U₂, P₂}}. The Jaccard similarity coefficient may be determined by the following equation:

$$\frac{|A \cap B|}{|A \cup B|}. \qquad \text{(Equation 1)}$$

In this example, the size of the intersection of A and B is two elements, and the size of the union of A and B is three elements, consequently, the Jaccard similarity coefficient is ⅔, or 0.66. In this example, if the Jaccard similarity coefficient of the first set of access attempts and the second set of access attempts is greater than a first threshold, then the security platform 102 may determine that the first set of access attempts is similar to the second set of access attempts. The first threshold may be specified according to a level of caution, where greater caution levels are associated with lower thresholds. In this example, the first threshold may be 0.8, but the first threshold may be higher or lower in other examples.

In some implementations, to determine whether one set of access attempts is similar to another set of access attempts, the security platform 102 may determine an overlap coefficient. An overlap coefficient may be a Szymkiewicz-Simpson coefficient, among other types of overlap coefficients. For example, a first set may be A, where A={{$U_1$, $P_1$}, {$U_2$, $P_2$}, {$U_3$, $P_3$}, {$U_4$, $P_4$}}, and a second set may be B, where B={{$U_1$, $P_1$}, {$U_2$, $P_2$}, {$U_3$, $P_3$}}. The overlap coefficient may be determined by the following equation:

$$\frac{|A \cap B|}{\min(|A|, |B|)}. \qquad \text{(Equation 2)}$$

In this example, the size of the intersection of A and B is three elements, and the minimum of the size of A and the size of B is three elements, consequently, the overlap coefficient is 3/3, or 1. In this example, if the overlap coefficient of the first set of access attempts and the second set of access attempts is greater than a second threshold, then the security platform 102 may determine that the first set of access attempts is similar to the second set of access attempts. The second threshold may be specified according to a level of caution, where greater caution levels are associated with lower thresholds. In this example, the second threshold may be 0.9, but the second threshold may be higher or lower in other examples.

Continuing this example, if the security platform 102 determines that the second set of access attempts is not similar to the first set of access attempts, the security platform 102 may continue to compare the second set of access attempts to each other set of access attempts associated with hash data stored within the data store 108. If the security platform 102 determines that the second set of access attempts is not similar to any of the sets of access attempts associated with cyberattacks, then the security platform 102 may allow the access attempt without generating an alert.

Figure 2:
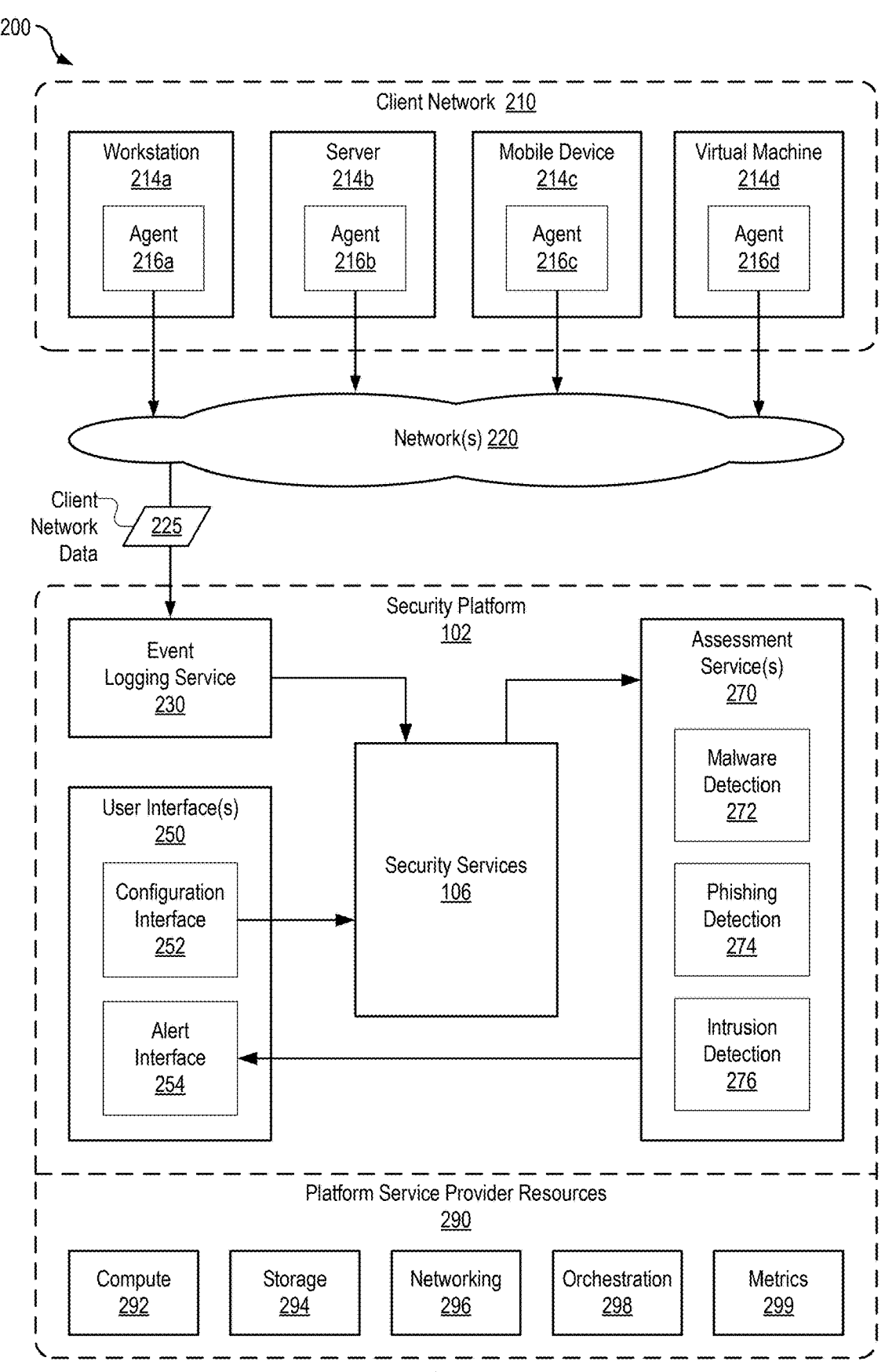
FIG. 2 is a block diagram illustrating example computing resources that implement a security platform, in accordance with some embodiments.

FIG. 2 is a block diagram illustrating the security platform 102, according to some embodiments.

The security platform 102 may comprise one or more services implemented within a cloud computing environment and/or on a platform service provider network, such as a platform-as-a-service (PaaS) network, an infrastructure-as-a-service provider (IaaS) network, or a software-as-a-service (Saas) network. The security platform 102 may be configured to communicate with agents 216*a-d* deployed on computing resources in a client network 210.

In this example, the client network 110 described with respect to FIG. 1 may be implemented by the client network 210, and computing resources 116*a*-116*d* may be implemented by computing resources 214*a*-214*d*. In this example, network device 104 may be implemented by networking resources 296, and data store 108 may be implemented by storage 294.

The agents 216 may communicate with the security platform 102 over one or more intermediary networks 220. In some embodiments, the agents 216 may be configured to collect or compile network activity data or network event data, and transmit the data, depicted as client network data 225, to the security platform 102. The security platform 102 may receive network activity data from many different client networks operated by different entities, companies, organizations, groups, etc., and perform remote monitoring of the networks of these different clients.

As shown, the client network 210 in this example includes different types of computing resources, such as a workstation 214*a*, a server 214*b*, a mobile device 214*c*, and a virtual machine 214*d*. The virtual machine 214*d* may be an instance of a computer and operating system that is emulated and hosted on a physical virtual machine host. The virtual machine host may implement virtualization hardware and/or software (e.g., a hypervisor) to execute and manage multiple instances of guest operating systems. Example implementations of such virtualization technologies include VMware ESX/ESXI, Microsoft Hyper-V, Amazon Web Services, and Microsoft Azure. Another type of virtualized execution environment may be a hosted container, which provides a portable and isolated execution environment over a host operating system of a physical host. Examples of container hosting technologies include Docker, Google Kubernetes, Amazon Web Services, and Microsoft Azure. In some embodiments, the virtual machine 214*d* may be hosted in a platform service provider network, such as the platform service provider network that is hosting the security platform 102. In some embodiments, the agents 216 may be deployed on other types of computing systems, including embedded systems, networking devices, storage devices, Internet-of-Things (IoT) devices, vehicles, and the like.

In various embodiments, the network 220 may encompass any suitable combination of networking hardware and protocols necessary to enable communications between the agents 216 and the security platform 102. In some embodiments, the remote machines 214 may execute in a private network of a company, behind a company firewall, and the network 220 may include a public network such as the Internet, which lies outside the firewall. The network 220 may encompass the different telecommunications networks and service providers that collectively implement the Internet.

In some embodiments, the network 220 may also include private networks such as private local area networks (LANs), private wide area networks (WANs), or private wireless networks. The network 220 may be implemented using different hardware (e.g., modems, routers, switches, load balancers, proxy servers, etc.) and software (e.g., protocol stacks, routing software, firewall/security software, etc.) for establishing networking links between the remote machines 214 and the security platform 102. In some embodiments, the agents 216 may transmit the client network data 225 to the security platform 102 over secure communication channels such as transport layer security (TLS) connections implemented over the network 220.

As shown in this example, the security platform 102 is implemented using a number of supporting services 230, 108, 250, and 270 implemented by the platform service provider network. Clients of the security platform 102 may convey service requests to and receive responses from these services via their respective service interfaces. In some embodiments, the service request and responses may be defined as part of a RESTful API (e.g., one or more web services). The requests and responses may be formatted as JSON documents. In some embodiments, the security platform 102 may implement service interfaces using other types of remote procedure calling protocols, such as Google Protocol Buffers. The platform service provider network may provide the hardware and/or software needed to implement service endpoints for these services, and the request routing facilities to ensure that a request is properly routed to the appropriate endpoints.

As shown, the platform service provider network may provide different types of computing resources, such as platform service provider resources 290, which can be used by customers to implement hosted services. As shown, the platform service provider may provide resource services such as compute resource service 292, storage resource service 294, networking resources service 296, orchestration service 298, and resource metrics service 299. The services of the security platform 102 may be built using these underlying resource services provided by the platform service provider.

In some embodiments, the platform service provider resources 290 may implement features such as load balancing of service requests and/or dynamic management and scaling of service node pools. In some embodiments, each of the services 230, 108, 250, and 270 may be implemented using a pool of service nodes provided by the platform service provider, which may be individual instances of virtual machines. In some embodiments, the platform service provider may be a provider such as Amazon Web Services or Microsoft Azure.

In some embodiments, the security platform 102 may be configured to monitor, analyze, and respond to security-related incidents that are detected in the remote client networks 210. In some embodiments, the security platform 102 may implement an event logging service 230 that receives client network data 225 from a client network 210 and stores the received data. The event logging service 230 may implement service functionality to allow users or other software components to query the event logs.

As shown, in some embodiments, the assessment service(s) 270 may implement a variety of monitoring processes to generate alerts in response to detected security problems in the client network 210. These alerts may be forwarded to an alert interface 254, which may allow human security analysts to perform a more in-depth examination of any underlying security problems. For example, in some embodiments, a malware detection module 272 may examine collected machine event logs to detect installation of a particular type of malware executable. As another example, a phishing detection module 274 may examine the email event logs to detect phishing attacks using new or unusual email addresses, web addresses, or email content. As yet another example, an intrusion detection module 276 may examine the network event logs to detect suspicious communication patterns or attacker packet signatures. In some embodiments, the alerts generated by the assessment service(s) 270 may trigger automated mitigation actions to be performed on the client network 210 to address detected threats in the client network.

In some embodiments, the security platform 102 may implement one or more user interface(s) 250, which may be implemented as GUIs or web interfaces viewable using a web browser. In some embodiments, these user interfaces 250 may be implemented by client-side applications. As shown, the user interfaces may include the alert interface 254 to notify users of detected alerts. In some embodiments, the alert interface 254 may be accessible from both the client network 210 and a central monitoring location where security analysts are monitoring the client network.

In some embodiments, the user interface(s) 250 may also implement a configuration interface 252. The configuration interface 252 may be used to configure various aspects of the security platform 102, including the security service 108. For example, the configuration interface 252 may be used to control various aspects of how the security service 108 operates, including initiating a scan, indicating one or more computing resources, and/or specifying a scanning schedule.

In some implementations, the security platform 102 may be implemented within a container system of a cloud computing environment or a container system of a data center. For example, a container system may be implemented by one or more container orchestration systems, including Kubernetes™, Docker Swarm™, among others. The container orchestration system may run on a cluster of nodes. In some examples, a given node may comprise a container runtime, where the given node may be implemented by one or more compute instances provided by a cloud services provider. In some examples, a given node among the cluster of nodes may comprise a container runtime, compute resources, memory, and one or more container instances.

In some implementations, the security platform 102 may comprise multiple services. For example, the security platform 102 may comprise services implemented by containerized applications operating on one or more nodes of a cluster. In this example, the security platform 102 may be implemented by a one or more containerized applications.

FIG. 3 is a block diagram 300 illustrating various components of a security platform profiling cyberattacks, according to some embodiments.

In this example, the security platform 102 is depicted at three different times to illustrate a sequence of steps to determine whether a set of access attempts is indicative of a cyberattack based on previous cyberattacks.

In this example, at a first time, time=$t_1$, the security platform 102 may determine a plurality of access attempts associated with a cyberattack. Based on the plurality of access attempts, the security platform 102 may determine one or more sets of access attempts. In this example, a first set of access attempts is represented by first access attempt data 302. A given set of access attempts among the plurality of access attempts may be determined using time-based clustering, as described with respect to FIG. 1. The security platform 102 may use a hash function to determine first hash data 304 based on applying the hash function to the first access attempt data 302. While a single first hash data 304 value is depicted, in general, for each of the one or more sets of access attempts, the security platform may determine respective hash data.

Further in this example, the security platform 102 may, in addition to or instead of generating hash data for each set of access attempts, store the one or more sets of access attempts. For example, the hash data may be used as an optimization, but in some implementations, the security platform 102 may use set similarity without using hash data to determine whether a set of ongoing access attempts is similar enough to a set of access attempts associated with cyberattacks to determine that the set of ongoing access attempts is indicative of a cyberattack.

At a second time, time=$t_2$, the security platform 102 may determine one or more access attempts to one or more computing resources of the client network 110. Second access attempt data 306 may be indicative of the one or more access attempts to the one or more computing resources within the client network 110. The security platform 102 may determine that a second set of access attempts comprises the one or more access attempts to the one or more computing resources within the client network 110. The security platform 102 may apply the hash function to the second access attempt data 306 to generate second hash data 308. The security platform 102 may determine a second set of access attempts to comprise the one or more access attempts based on time-based clustering, where time-based clustering is described above with respect to FIG. 1.

At a third time, time=t₃, the security platform 102 may determine whether to generate an alert based on whether the first access attempt data 302 is greater than a threshold level of similarity to the second access attempt data 306. The security platform 102 may determine similarity based on one or more of: comparing hash data associated with access attempt data, determining a set similarity value, or determining a set overlap coefficient. These three examples for step 310 are described in greater detail below.

At 310, the security platform 102 may compare the first hash data 304 to the second hash data 308. If the first hash data 304 is equal to the second hash data 308, then the security platform 102, at 312, may determine that the first access attempt data 302 is greater a threshold level of similarity to the second access attempt data 306. Based on the first access attempt data 302 being greater than the threshold level of similarity to the second access attempt data 306, the security platform 102 may, at 314, generate an alert indicative of a cyberattack. The alert may comprise profile data on a threat actor associated with the first access attempt data 302. In this example, for the hash data comparison, the threshold may be 1, which may be indicative of the hash data being equal.

At 310, the security platform 102 may determine a set similarity value based on the first access attempt data 302 and the second access attempt data 306. As described above, the security platform 102 may determine a set similarity value based on calculating a Jaccard similarity. The set similarity value may be based on the first set of access attempts indicated by the first access attempt data 302, and the second set of access attempts indicated by the second access attempt data 306. Based on the first access attempt data 302 being greater than the threshold level of similarity to the second access attempt data 306, the security platform 102 may, at 314, generate an alert indicative of a cyberattack. Threshold examples for set similarity are described above with respect to FIG. 1. The alert may comprise profile data on a threat actor associated with the first access attempt data 302.

At 310, the security platform 102 may determine a set overlap coefficient based on the first access attempt data 302 and the second access attempt data 306. As described above, the security platform 102 may determine a set overlap coefficient based on calculating a Szymkiewicz-Simpson coefficient. The set overlap coefficient may be based on the first set of access attempts indicated by the first access attempt data 302, and the second set of access attempts indicated by the second access attempt data 306. Based on the first access attempt data 302 being greater than the threshold level of similarity to the second access attempt data 306, the security platform 102 may, at 314, generate an alert indicative of a cyberattack. Threshold examples for set overlap coefficients are described above with respect to FIG. 1. The alert may comprise profile data on a threat actor associated with the first access attempt data 302.

Continuing this example, if the security platform 102 determines that the first access attempt data 302 is not greater than a threshold level of similarity to the second access attempt data 306, then the process may continue at 316. Continuation may include determining additional sets of access attempts based on cyberattacks detected by the network device 104 or determining additional access attempts to computing resources of the client network 110.

FIG. 4 is a flowchart 400 that illustrates an example of the security platform profiling cyberattacks, according to some embodiments. In FIG. 4, one or more hardware processors may be used to implement the example process.

The example process includes: determining, at 410, with respect to a first network device, a first set of access attempts, where the first network device is associated with detecting unauthorized access to a computing resource; determining, at 420, with respect to a second network device, a second set of access attempts associated with the computing resource; determining, at 430, a measure of similarity between the first set of access attempts and the second set of access attempts; and determining, at 440, based on the measure of similarity being greater than a similarity threshold, that the second set of access attempts is indicative of a cyberattack.

Determining, at 410, with respect to the first network device, a first set of access attempts, where the first network device is associated with detecting unauthorized access to the computing resource may be carried out as described with respect to FIGS. 1-3. For example, the security platform 102 may use time-based clusters to determine sets of access attempts. The security platform 102 may determine first access attempt data 302 indicative of one or more sets of access attempts and determine one or more hashes based on the access attempt data.

Determining, at 420, with respect to the second network device, a second set of access attempts associated with the computing resource may be carried out as described with respect FIGS. 1-3. For example, the security platform 102 may determine second access attempt data 306 indicative of one or more access attempts on a computing resource of the client network 110.

Determining, at 430, the measure of similarity between the first set of access attempts and the second set of access attempts may be carried out as described with respect to FIGS. 1-3. For example, the security platform 102 may determine a measure of similarity based on a comparison of hash data, based on set similarity between the first set of access attempts and the second set of access attempts, and/or based on a set overlap coefficient between the first set of access attempts and the second set of access attempts.

Determining, at 440, based on the measure of similarity being greater than a similarity threshold, that the second set of access attempts is indicative of a cyberattack may be carried out as described with respect to FIGS. 1-3. For example, the security platform 102 may determine whether a measure of similarity between sets of access attempts is greater than a threshold, as described with respect to steps 310 and 312 of FIG. 3.

Thus, FIG. 4 illustrates an example of a security platform 102 profiling a cyberattack.

Figure 5:
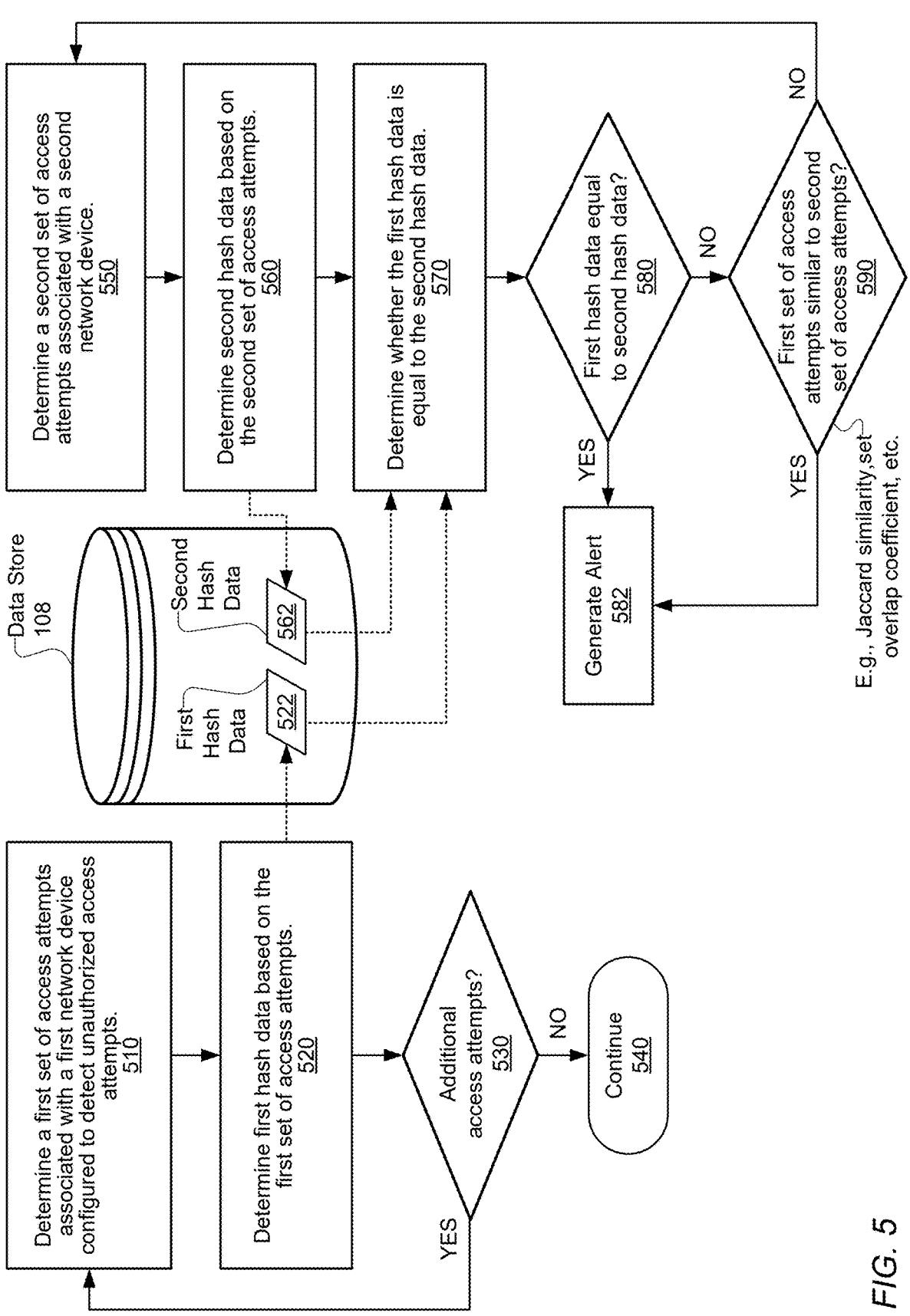
FIG. 5 is a flowchart that illustrates an example of a security platform providing cyberattack profiling, according to some embodiments.

FIG. 5 is a flowchart 500 that illustrates an example of the security platform profiling cyberattacks, according to some embodiments. In FIG. 5, one or more hardware processors may be used to implement the example process.

The example flowchart 500 includes two processes. A first process describes determining sets of access attempts from among a plurality of access attempts, including a first set of access attempts, where the plurality of access attempts is classified as cyberattacks. The first process also includes determining first hash data based on the first set of access attempts. The second process describes determining whether one or more access attempts are indicative of a cyberattack based on the access attempts classified as being associated with at least one cyberattack.

The first process includes the security platform 102 determining, at 510, a first set of access attempts associated with a first network device, where the first network device is configured to detect unauthorized access attempts. Step 510 may be carried out as described above with respect to FIGS. 1-4.

The first process further includes the security platform 102 determining, at 520, first hash data 522 based on the first set of access attempts. Step 520 may be carried out as described above with respect to FIGS. 1-4.

The first process further includes the security platform 102 determining, at 530, whether additional access attempts are being attempted. If additional access attempts are being attempted, the process continues at 510. If no additional access attempts are being attempted or detected, the security platform 102 may continue at 540. In this example, step 540 may include waiting for additional access attempts directed to the first network device, such as network device 104, described with respect to FIG. 1.

The second process includes the security platform 102 determining, at 550, a second set of access attempts associated with a second network device. Step 550 may be carried out as described with respect to FIGS. 1-4.

The second process includes the security platform 102 determining, at 560, second hash data 562 based on the second set of access attempts. Step 560 may be carried out as described with respect to FIGS. 1-4.

The second process includes the security platform 102 determining, at 570, whether the first hash data 522 is equal to the second hash data 562. If, at 580, the security platform 102 determines that the first hash data 522 is equal to the second hash data 562, then the security platform 102 may generate, at 582, an alert. If, at 580, the security platform 102 determines that the first hash data 522 is not equal to the second hash data 562, then the security platform 102 may continue to step 590.

The second process includes the security platform 102 determining, at 590, whether the first set of access attempts is similar to the second set of access attempts. Step 590 may be carried out as described with respect to FIGS. 1-4, including determining similarity based on a set similarity or set overlap coefficient.

Figure 6:
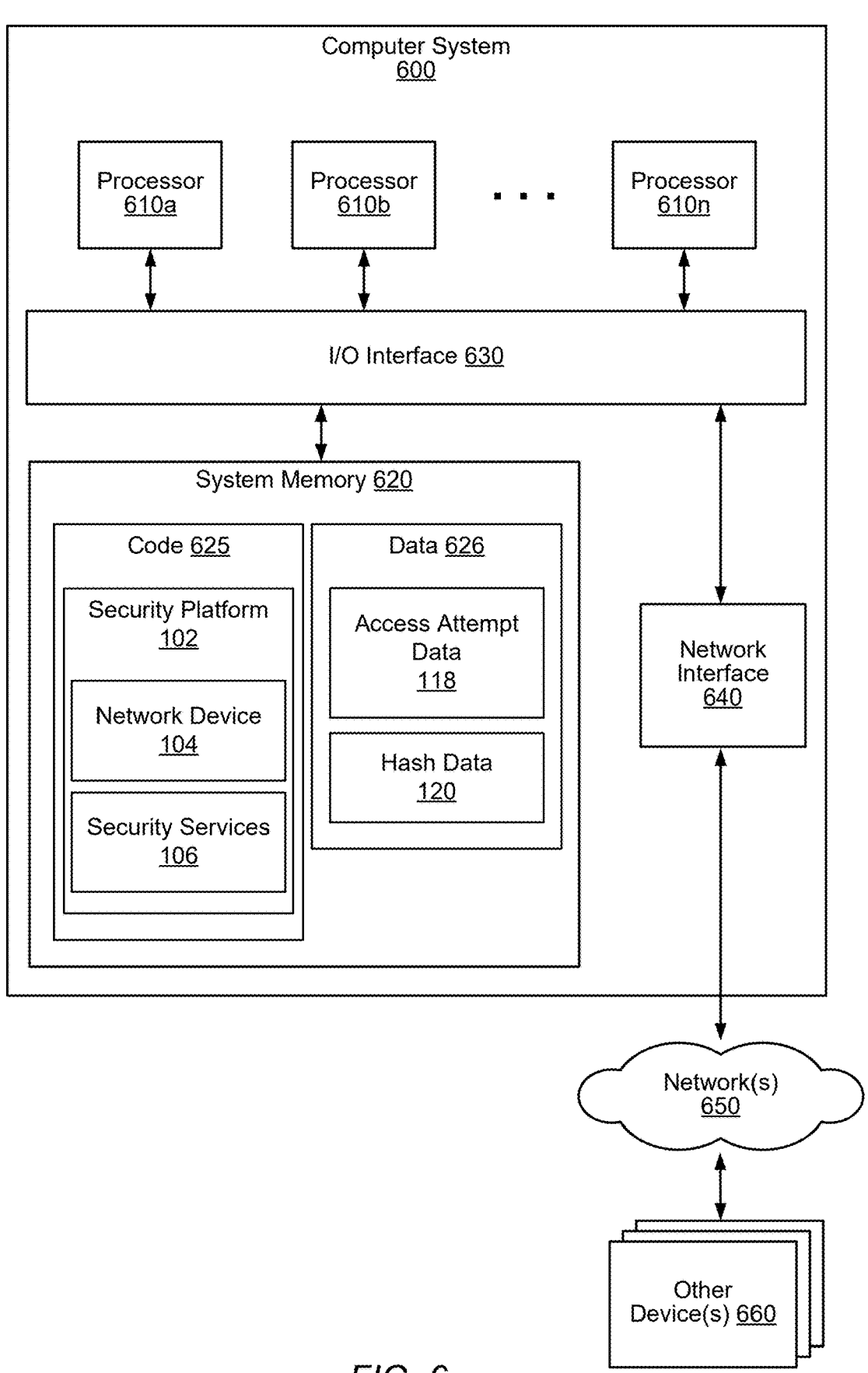
FIG. 6 is a block diagram illustrating an example computer system that may be used to implement one or more portions of a system that implements predictive scan engine runtime durations, according to some embodiments.

FIG. 6 is a block diagram illustrating an example computer system 600 that is used to implement one or more portions of a system that implements a security platform 102, according to some embodiments. For example, the computer system 600 may be a server that implements one or more components of the security platform 102 of FIGS. 1-5.

Computer system 600 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 600 includes one or more processors 610, which may include multiple cores coupled to a system memory 620 via an input/output (I/O) interface 630. Computer system 600 further includes a network interface 640 coupled to I/O interface 630. In some embodiments, computer system 600 may be a uniprocessor system including one processor 610, or a multiprocessor system including several processors 610*a-n*, as shown. The processors 610 may be any suitable processors capable of executing instructions. For example, in various embodiments, processors 610 may implement one of a number of instruction set architectures (ISAs), such as the x86, PowerPC, SPARC, or MIPS ISA.

As shown, the computer system 600 may also include one or more network communication devices (e.g., network interface 640) for communicating with other systems and/or components over a communications network. For example, an instance of an application executing on computer system 600 may use network interface 640 to communicate with another server application executing on another computer system, as described herein.

As shown, computer system 600 may use its network interface 640 to communicate with one or more other devices 660, such as persistent storage devices and/or one or more I/O devices. In some embodiments, some of these other devices may be implemented locally on the computer system 600, accessible via the I/O interface 630. In various embodiments, persistent storage devices may include disk drives, tape drives, solid state memory, other mass storage devices, or any other persistent storage device. The computer system 600 may store instructions and/or data in persistent storage devices and retrieve the stored instruction and/or data as needed.

As shown, the computer system 600 may include one or more system memories 620 that store instructions and data accessible by processor(s) 610. In various embodiments, system memories 620 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 620 may be used to store code 625 or executable instructions to implement the methods and techniques described herein. For example, the executable instructions may include instructions to implement a network scanner (including associated sub-components: a network latency component; a dynamic RTT timeout value; RTT parameters; and a statistics components). The system memory 620 may also be used to store data 626 needed or produced by the executable instructions. For example, the in-memory data 626 may include access attempt 122 and hash data 120, as discussed with respect to FIG. 1.

In some embodiments, some of the code 625 or executable instructions may be persistently stored on the computer system 600 and may have been loaded from external storage media. The persistent storage of the computer system 600 and the external media are examples of non-transitory computer-readable storage media, which may be used to store program instructions to be executed by the computer system 600. A non-transitory computer-readable storage medium may provide the capability to store information in a form readable by a machine (e.g., computer system 600). Non-transitory computer-readable media may include storage media such as magnetic or optical media, disk or DVD/CD-ROM devices, archival tapes, network-attached storage systems, or other computer systems.

In some embodiments, the I/O interface 630 may be configured to coordinate I/O traffic between processor 610, system memory 620 and any peripheral devices in the system, including through network interface 640 or other peripheral interfaces. In some embodiments, I/O interface 630 may perform any necessary protocol, timing, or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments, some or all of the functionality of I/O interface 630, such as an interface to system memory 620, may be incorporated directly into processor 610.

In some embodiments, the network interface 640 may allow data to be exchanged between computer system 600 and other devices attached to a network. The network interface 640 may also allow communication between computer system 600 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems. Multiple input/output devices may be present in computer system 600 or may be distributed on various nodes of a distributed system that includes computer system 600. In some embodiments, similar input/output devices may be separate from computer system 600 and may interact with one or more nodes of a distributed system that includes computer system 600 through a wired or wireless connection, such as over network interface 640. Network interface 640 may commonly support one or more wireless networking protocols (e.g., Wi-Fi/IEEE 802.11, or another wireless networking standard). In some embodiments, the network interface 640 may support communication via telecommunications/telephony networks such as analog voice networks or digital fiber communications networks, via storage area networks such as Fibre Channel SANs, or via any other suitable type of network and/or protocol.

Advantages and features of the present disclosure may be further described by the following 20 statements.

1. A method comprising: determining, with respect to a first network device, a first set of access attempts, wherein the first network device is associated with detecting unauthorized access to a computing resource; determining, with respect to a second network device, a second set of access attempts associated with the computing resource; determining a measure of similarity between the first set of access attempts and the second set of access attempts; and determining, based on the measure of similarity being greater than or equal to a similarity threshold, that the second set of access attempts is indicative of a cyberattack.

2. The method of any of the preceding statements, wherein the first network device is configured to interact with a threat actor, and wherein the first network device is isolated from other network devices of a client network.

3. The method of any of the preceding statements, further comprising: determining, over a period of time and with respect to the first network device, a plurality of access attempts; and determining one or more time-based clusters of access attempts; wherein the first set of access attempts comprises a time-based cluster of access attempts from among the one or more time-based clusters of access attempts.

4. The method of any of the preceding statements, further comprising: determining, based on a hash function applied to the first set of access attempts, first hash data; and determining, based on the hash function applied to the second set of access attempts, second hash data.

5. The method of any of the preceding statements, wherein, based on the first hash data being equal to the second hash data: the measure of similarity is indicative of the first set of access attempts being equal to the second set of access attempts.

6. The method of any of the preceding statements, wherein, based on the first hash data not being equal to the second hash data: determining, based on an intersection of the first set of access attempts and the second set of access attempts, a third set of access attempts; and determining, based on a union of the first set of access attempts and the second set of access attempts, a fourth set of access attempts; wherein the measure of similarity being greater than the similarity threshold is based on a ratio of the third set of access attempts and the fourth set of access attempts.

7. The method of any of the preceding statements, further comprising: determining subset data indicative of (i) the first set of access attempts being a subset of the second set of access attempts or of (ii) the second set of access attempts being a subset of the first set of access attempts; wherein the measure of similarity being greater than the similarity threshold is based on the subset data.

8. A system comprising: a memory storing executable instructions; and one or more processors that execute the executable instructions to: determine, with respect to a first network device, a first set of access attempts, wherein the first network device is associated with detecting unauthorized access to a computing resource; determine, with respect to a second network device, a second set of access attempts associated with the computing resource; determine a measure of similarity between the first set of access attempts and the second set of access attempts; and determine, based on the measure of similarity being greater than a similarity threshold, that the second set of access attempts is indicative of a cyberattack.

9. The system of any of the preceding statements, wherein the first network device is configured to interact with a security threat, and wherein the first network device is isolated from other network devices of a client network.

10. The system of any of the preceding statements, wherein the one or more processors further execute the executable instructions to: determine, over a period of time and with respect to the first network device, a plurality of access attempts; and determine one or more time-based clusters of access attempts; wherein the first set of access attempts comprises a time-based cluster of access attempts from among the one or more time-based clusters of access attempts.

11. The system of any of the preceding statements, wherein the one or more processors further execute the executable instructions to: determine, based on a hash function applied to the first set of access attempts, first hash data; and determine, based on the hash function applied to the second set of access attempts, second hash data.

12. The system of any of the preceding statements, wherein, based on the first hash data being equal to the second hash data, the one or more processors further execute the executable instructions to: the measure of similarity is indicative of the first set of access attempts being equal to the second set of access attempts.

13. The system of any of the preceding statements, wherein, based on the first hash data not being equal to the second hash data, the one or more processors further execute the executable instructions to: determine, based on an intersection of the first set of access attempts and the second set of access attempts, a third set of access attempts; and determine, based on a union of the first set of access attempts and the second set of access attempts, a fourth set of access attempts; wherein the measure of similarity being greater than the similarity threshold is based on a ratio of the third set of access attempts and the fourth set of access attempts.

14. The system of any of the preceding statements, wherein the one or more processors further execute the executable instructions to: determine subset data indicative of (i) the first set of access attempts being a subset of the second set of access attempts or of (ii) the second set of access attempts being a subset of the first set of access attempts; wherein the measure of similarity being greater than the similarity threshold is based on the subset data.

15. One or more non-transitory computer-accessible storage media storing executable instructions that, when executed by one or more processors, cause a computer system to: determine, with respect to a first network device, a first set of access attempts, wherein the first network device is associated with detecting unauthorized access to a computing resource; determine, with respect to a second network device, a second set of access attempts associated with the computing resource; determine a measure of similarity between the first set of access attempts and the second set of access attempts; and determine, based on the measure of similarity being greater than a similarity threshold, that the second set of access attempts is indicative of a cyberattack.

16. The non-transitory computer-accessible storage media of any of the preceding statements, wherein the first network device is configured to interact with a security threat, and wherein the first network device is isolated from other network devices of a client network.

17. The non-transitory computer-accessible storage media of any of the preceding statements, wherein the one or more processors further execute the executable instructions to: determine, over a period of time and with respect to the first network device, a plurality of access attempts; and determine one or more time-based clusters of access attempts; wherein the first set of access attempts comprises a time-based cluster of access attempts from among the one or more time-based clusters of access attempts.

18. The non-transitory computer-accessible storage media of any of the preceding statements, wherein the one or more processors further execute the executable instructions to: determine, based on a hash function applied to the first set of access attempts, first hash data; and determine, based on the hash function applied to the second set of access attempts, second hash data.

19. The non-transitory computer-accessible storage media of any of the preceding statements, wherein, based on the first hash data being equal to the second hash data, the one or more processors further execute the executable instructions to: the measure of similarity is indicative of the first set of access attempts being equal to the second set of access attempts.

20. The non-transitory computer-accessible storage media of any of the preceding statements, wherein, based on the first hash data not being equal to the second hash data, the one or more processors further execute the executable instructions to: determine, based on an intersection of the first set of access attempts and the second set of access attempts, a third set of access attempts; and determine, based on a union of the first set of access attempts and the second set of access attempts, a fourth set of access attempts; wherein the measure of similarity being greater than the similarity threshold is based on a ratio of the third set of access attempts and the fourth set of access attempts.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A method comprising:

determining, with respect to a first network device, a first set of access attempts, wherein the first network device is associated with detecting unauthorized access to a computing resource;

determining, with respect to a second network device, a second set of access attempts associated with the computing resource;

determining a measure of similarity between the first set of access attempts and the second set of access attempts, wherein the measure of similarity is calculated based on (a) an intersection of the first set of access attempts and the second set of access attempts and (b) a union of the first set of access attempts and the second set of access attempts;

determining, based on the measure of similarity being greater than or equal to a similarity threshold, that the second set of access attempts is part of a brute force cyberattack attempting to access the computing resource and that the brute force cyberattack matches a threat actor profile associated with a threat actor; and determining, based on a hash function applied to the first set of access attempts, first hash data and based on the hash function applied to the second set of access attempts, second hash data, wherein based on the first hash data not being equal to the second hash data:

determining, based on the intersection of the first set of access attempts and the second set of access attempts, a third set of access attempts, and determining, based on the union of the first set of access attempts and the second set of access attempts, a fourth set of access attempts, wherein the measure of similarity being greater than the similarity threshold is based on a ratio of a size of the third set of access attempts and a size of the fourth set of access attempts.

2. The method of claim 1, wherein the first network device is configured to interact with threat actors, and wherein the first network device is isolated from other network devices of a client network.

3. The method of claim 1, further comprising:

determining, over a period of time and with respect to the first network device, a plurality of access attempts; and determining one or more time-based clusters of access attempts;

wherein the first set of access attempts comprises a time-based cluster of access attempts from among the one or more time-based clusters of access attempts.

4. The method of claim 1, wherein, based on the first hash data being equal to the second hash data:

the measure of similarity is indicative of the first set of access attempts being equal to the second set of access attempts.

5. The method of claim 1, further comprising:

determining subset data indicative of (i) the first set of access attempts being a subset of the second set of access attempts or of (ii) the second set of access attempts being a subset of the first set of access attempts;

wherein the measure of similarity being greater than the similarity threshold is based on the subset data.

6. A system comprising:

a memory storing executable instructions; and one or more processors that execute the executable instructions to:

determine, with respect to a first network device, a first set of access attempts, wherein the first network device is associated with detecting unauthorized access to a computing resource; determine, with respect to a second network device, a second set of access attempts associated with the computing resource;

determine a measure of similarity between the first set of access attempts and the second set of access attempts, wherein the measure of similarity is calculated based on (a) an intersection of the first set of access attempts and the second set of access attempts and (b) a union of the first set of access attempts and the second set of access attempts;

determine, based on the measure of similarity being greater than or equal to a similarity threshold, that the second set of access attempts is part of a brute force cyberattack attempting to access the computing resource and that the brute force cyberattack matches a threat actor profile associated with a threat actor; and determine, based on a hash function applied to the first set of access attempts, first hash data and based on the hash function applied to the second set of access attempts, second hash data, wherein based on the first hash data not being equal to the second hash data:

determine, based on the intersection of the first set of access attempts and the second set of access attempts, a third set of access attempts, and determine, based on the union of the first set of access attempts and the second set of access attempts, a fourth set of access attempts, wherein the measure of similarity being greater than the similarity threshold is based on a ratio of a size of the third set of access attempts and a size of the fourth set of access attempts.

7. The system of claim 6, wherein the first network device is configured to interact with a security threat, and wherein the first network device is isolated from other network devices of a client network.

8. The system of claim 6, wherein the one or more processors further execute the executable instructions to:

determine, over a period of time and with respect to the first network device, a plurality of access attempts; and determine one or more time-based clusters of access attempts;

wherein the first set of access attempts comprises a time-based cluster of access attempts from among the one or more time-based clusters of access attempts.

9. The system of claim 6, wherein, based on the first hash data being equal to the second hash data, the one or more processors further execute the executable instructions to:

the measure of similarity is indicative of the first set of access attempts being equal to the second set of access attempts.

10. The system of claim 6, wherein the one or more processors further execute the executable instructions to:

determine subset data indicative of (i) the first set of access attempts being a subset of the second set of access attempts or of (ii) the second set of access attempts being a subset of the first set of access attempts;

wherein the measure of similarity being greater than the similarity threshold is based on the subset data.

11. One or more non-transitory computer-accessible storage media storing executable instructions that, when executed by one or more processors, cause a computer system to:

determine, with respect to a first network device, a first set of access attempts, wherein the first network device is associated with detecting unauthorized access to a computing resource;

determine, with respect to a second network device, a second set of access attempts associated with the computing resource, wherein the measure of similarity is calculated based on (a) an intersection of the first set of access attempts and the second set of access attempts and (b) a union of the first set of access attempts and the second set of access attempts;

determine a measure of similarity between the first set of access attempts and the second set of access attempts; and determine, based on the measure of similarity being greater than or equal to a similarity threshold, that the second set of access attempts is part of a brute force cyberattack attempting to access the computing resource and that the brute force cyberattack matches a threat actor profile associated with a threat actor;

determine, based on the intersection of the first set of access attempts and the second set of access attempts, a third set of access attempts; and determine, based on the union of the first set of access attempts and the second set of access attempts, a fourth set of access attempts, wherein the measure of similarity being greater than the similarity threshold is based on a ratio of a size of the third set of access attempts and a size of the fourth set of access attempts.

12. The non-transitory computer-accessible storage media of claim 11, wherein the first network device is configured to interact with a security threat, and wherein the first network device is isolated from other network devices of a client network.

13. The non-transitory computer-accessible storage media of claim 11, wherein the executable instructions when executed by the one or more processors cause the computer system to:

determine, over a period of time and with respect to the first network device, a plurality of access attempts; and determine one or more time-based clusters of access attempts;

wherein the first set of access attempts comprises a time-based cluster of access attempts from among the one or more time-based clusters of access attempts.

14. The non-transitory computer-accessible storage media of claim 11, wherein the executable instructions when executed by the one or more processors cause the computer system to:

determine, based on a hash function applied to the first set of access attempts, first hash data; and determine, based on the hash function applied to the second set of access attempts, second hash data, wherein the measure of similarity is based on the first set of access attempts being equal to the second set of access attempts and first hash data being equal to the second hash data.

15. The non-transitory computer-accessible storage media of claim 14, wherein the matching of the second set of access attempts to the threat actor profile is based on comparison of the second hash data to multiple hash data values stored in a database.

\* \* \* \* \*